United States Patent
Pilarski et al.

(10) Patent No.: US 11,306,199 B2
(45) Date of Patent: Apr. 19, 2022

(54) ELASTOMER FORMULATION USING A COMBINATION OF POLYMERS TO CREATE OZONE RESISTANCE WITHOUT ADDITION OF WAX

(71) Applicant: The Pullman Company, Milan, OH (US)

(72) Inventors: Jeanette Pilarski, Amherst, OH (US); Joshua R. Goossens, Norwalk, OH (US)

(73) Assignee: The Pullman Company, Milan, OH (US)

(*) Notice: Subject to any disclaimer, the term of this patent is extended or adjusted under 35 U.S.C. 154(b) by 0 days.

(21) Appl. No.: 16/741,037

(22) Filed: Jan. 13, 2020

(65) Prior Publication Data

US 2020/0148871 A1 May 14, 2020

Related U.S. Application Data

(62) Division of application No. 15/666,948, filed on Aug. 2, 2017, now Pat. No. 10,550,256.

(60) Provisional application No. 62/382,332, filed on Sep. 1, 2016.

(51) Int. Cl.
| | |
|---|---|
| *C08L 23/16* | (2006.01) |
| *C08L 7/00* | (2006.01) |
| *C08L 9/00* | (2006.01) |
| *C08L 81/00* | (2006.01) |
| *C08L 23/32* | (2006.01) |

(52) U.S. Cl.
CPC ............... *C08L 23/16* (2013.01); *C08L 7/00* (2013.01); *C08L 9/00* (2013.01); *C08L 23/32* (2013.01); *C08L 81/00* (2013.01); *C08L 2205/03* (2013.01); *C08L 2312/00* (2013.01)

(58) Field of Classification Search
CPC .... C08L 7/00; C08L 9/00; C08L 23/16; C08L 81/00; C08L 2312/00; C08L 2205/03; C08L 23/32
See application file for complete search history.

(56) References Cited

U.S. PATENT DOCUMENTS

| | | | |
|---|---|---|---|
| 4,645,793 A * | 2/1987 | Von Hellens | C08L 21/00 152/525 |
| 4,814,384 A | 3/1989 | Mitchell et al. | |
| 5,656,694 A | 8/1997 | Frechet et al. | |
| 6,800,691 B2 | 10/2004 | Graf | |
| 7,423,089 B2 | 9/2008 | Zhao et al. | |
| 8,609,760 B2 | 12/2013 | Jung et al. | |
| 2003/0204008 A1 | 10/2003 | Campion | |
| 2007/0142567 A1 * | 6/2007 | Aubert | C08L 23/16 525/333.7 |

FOREIGN PATENT DOCUMENTS

| | | |
|---|---|---|
| CN | 102079833 A | 6/2011 |
| JP | 2011225717 A | 11/2011 |

OTHER PUBLICATIONS

Information Sheet for caprolactam disulfide (Year: 2021).*
English language machine translation of JP 2011-225717, (Year; 2011).
First Chinese Office Action for Chinese Application No. CN201710770310.5 dated Apr. 27, 2021. No translation provided.

* cited by examiner

*Primary Examiner* — Angela C Scott

(57) ABSTRACT

A shaped article is formed from a cured rubber composition comprising EPDM and a diene rubber. The shaped article exhibits a coefficient of friction greater than 0.1.

14 Claims, No Drawings

ELASTOMER FORMULATION USING A COMBINATION OF POLYMERS TO CREATE OZONE RESISTANCE WITHOUT ADDITION OF WAX

CROSS-REFERENCE TO RELATED APPLICATIONS

The present disclosure is a divisional of U.S. patent application Ser. No. 15/666,948 filed on Aug. 2, 2017, which claims the benefit of U.S. Provisional Application No. 62/382,332, filed on Sep. 1, 2016. The entire disclosures of the above applications are incorporated herein by reference.

INTRODUCTION

Ozone resistance is becoming a more prevalent requirement in automotive applications in North America and has been made essentially mandatory in Europe. It has not been feasible to have a mechanically assembled free rubber or single-bonded part made with natural rubber that also has ozone protection. The traditional method of instilling ozone resistance in natural rubber has been to add a microcrystalline wax blend to the rubber. In operation, the wax blooms or exudes to the surface of the rubber and provides a barrier to ozone.

The wax on the surface of the rubber also causes it to have a low coefficient of friction. As a result, over time a mechanically assembled rubber part has a tendency to slide out of position or walk out. Until now, any part that needs ozone resistance has to be chemically bonded to all surfaces to prevent slippage or falling out of position when in application.

Thus, traditional chemical means of creating ozone resistance in natural rubber are not viable for all types of parts used, for example, in noise, vibration, and harshness (NVH) reduction products. It would be an advance to provide natural rubber parts having ozone resistance and suitable elastomeric properties.

SUMMARY

Resistance to ozone attack is increased in rubber parts by blending a natural rubber with a polymer that is inherently resistant to ozone attack. Such polymers include those that have saturated polymer main chains, because ozone is known to attack at polymer chain unsaturation. EPDM polymer is not readily miscible with the natural rubber and vulcanizes at a significantly slower rate. These obstacles are overcome and an ozone-resistant natural rubber formulation achieved, when the EPDM polymer is first modified by means of a reactive mix procedure in the internal mixer that prepared the rubber compositions. Compositions with suitable ozone resistance were achieved that have a minority of EPDM (for example less than 35%, or preferably about 25%, with the percent related to the total amount of rubber in the composition) with minimal to non-existent decrease in physical properties for durability and performance. Ozone-resistant rubber parts are thus produced that do not have the disadvantage of a low coefficient of friction arising from the prior art use of wax as an ozone treatment.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses.

DETAILED DESCRIPTION

In one embodiment, a shaped article is formed from a cured rubber composition containing EPDM and a diene rubber. The article has a coefficient of friction greater than 0.1, and preferably about 0.5 or higher. The high coefficient of friction results in some embodiments from the absence of wax in the shaped article. That is to say, ozone resistance is not achieved by adding wax as an additive. In preferred embodiments, the shaped articles give a passing score on an ozone-resistance test according to ASTM-D1149. For example, shaped articles give a pass when subjected to 50 pphm (parts per 100 million) ozone for 72 hours at 40° C. In other embodiments, ozone resistance is a pass at 200 pphm ozone concentration for up to 144 hours at 40° C.

Shaped articles are made by a method of curing a blend to make an ozone-resistant rubber composition. In the method, heat is applied to a blend containing a pretreated EPDM polymer, an uncured diene rubber, and a curing package that contains elemental sulfur. The uncured diene rubber is an olefin copolymer having unsaturation in the main chain and includes natural rubber, synthetic isoprene rubber, synthetic polychloroprene rubber, and other diene polymers and copolymers.

The pretreated EPDM polymer is prepared by reacting an EPDM polymer with a sulfur containing organic polymer, which in various embodiments includes a poly(alkyl phenol disulfide). It has been found that by a judicious choice of the reaction parameters (time and temperature), pretreatment by reacting with a sulfur containing organic polymer improves the compatibility of the EPDM and an uncured polymer having unsaturation in the main chain. As a result of the compatibility between the EPDM and the uncured diene rubber, the co-cured composition exhibits high ozone resistance attributable to the EPDM polymer, along with no diminution of physical properties of the cured diene rubber.

In other embodiments, a method is provided for making a vulcanizable rubber composition. The vulcanizable rubber composition is cured in conventional fashion by molding and applying heat to cure the EPDM and the diene rubber in the vulcanizable rubber composition.

The method for making the vulcanizable rubber composition involves heating while mixing a first composition that contains an EPDM elastomer and an accelerator to make a first pass intermediate. The accelerator is a sulfur containing organic polymer, and is an alkyl phenol disulfide polymer in an exemplary embodiment. Then the first pass intermediate is combined with a second composition that contains a sulfur crosslinkable natural or synthetic rubber to make a second pass intermediate. Finally, the second pass intermediate is combined with a curing package by mixing all of the ingredients at a temperature below a curing temperature to make the vulcanizable rubber formulation. In various embodiments, the curing package contains elemental sulfur and an activator such as zinc oxide (ZnO). Before the curing package is added, the temperature of mixing can be elevated to increase homogeneity of the blend of pretreated EPDM elastomer and the natural or synthetic rubber. After adding the curing package, however, care is taken to keep the temperature below a temperature at which significant curing takes place. As a result, the method provides an uncured or vulcanizable rubber composition containing a minor amount of uncured EPDM and a major amount of an uncured natural or synthetic rubber, the latter characterized by unsaturation in an all carbon main chain.

Thus in various embodiments, the present teachings provide a method of making a vulcanizable rubber composition (i.e., an uncured blend of elastomers that can be vulcanized or cured to produce molded articles). The teachings also provide for a method of curing a blend of EPDM and an uncured diene polymer to make an ozone-resistant rubber composition. Finally, the teachings provide shaped articles that contain a mixture of the EPDM and the diene rubber cured to such a degree that ozone resistance is enhanced in the blend and the physical properties are maintained from what would be achieved from the diene rubber by itself. In particular, the cured rubber compositions have a "normal" coefficient of friction that is not lowered by the presence of blooming wax on the surface. In typical installations, the coefficient of friction of the cured rubber-shaped article is in the range of 0.5 to 0.8 or 0.6 to 0.7.

By blending the natural rubber and EPDM polymers in the formulation and methods described, ozone resistance can be instilled in the finished rubber parts with minimal or no detriment to the physical properties and performance. For example, a 25% polymer replacement of natural (or synthetic) rubber with EPDM is sufficient to instill ozone resistance in excess of typical requirements such as 50 pphm ozone concentration for 72 hours at 40° C. Certain results indicate ozone resistance in 200 pphm ozone concentration for up to 144 hours at 40° C.

In other product types (such as tires), a minimum of 35% EPDM has been required to meet a lesser level of ozone resistance. The lower loading of EPDM in the current teachings (for example, 25 percent by weight of the total rubber) is a financial benefit since the EPDM polymer tends to be more expensive than natural rubber.

In another advantage, mechanically assembled rubber parts can now be provided with ozone resistance. The current industry standard use of wax to provide ozone resistance can cause mechanically assembled parts to move out of their proper position during assembly or use. The current teachings allow there to be protection against ozone in the rubber parts, but because of the high coefficient of friction, they do not have to be chemically bonded to the surrounding components.

Advantageously, the described blends of natural and synthetic rubber with EPDM compounds can be processed using typical standard procedures in injection and other molding processes with no discernable difference from a standard natural rubber compound. The procedure described can be used on numerous variations of formulations including different fillers, chemical modifiers, and cure systems.

Further details of various embodiments of the shaped articles, the curable (vulcanizable) rubber composition and methods for making them are provided in the description that follows. It is to be understood that parameters described in one embodiment or aspect can be mixed and matched with parameters described in other aspects to provide new described embodiments.

Cured and Uncured Polymers

Throughout the specification, a distinction is made between cured and uncured polymers, elastomers, rubbers, and the like. This is to acknowledge that elastomers are talked about in two states. The first is an uncured state and chemically corresponds to a polymer (usually an olefin copolymer or homopolymer) having olefinic unsaturation, either in the main chain or in a side chain. In a second cured state, at least some of the unsaturated groups on the polymer have been reacted with a curing compound (elemental sulfur in the examples described herein) to provide crosslinks. As curing or crosslinking progresses and the polymer goes from "uncured" to "cured," certain physical properties change in proportion to the degree of cure. Among these properties are hardness, tensile strength, and elongation at break. Cured elastomers have physical properties that make them desirable for uses in a variety of technological areas.

A polymer, elastomer, or rubber having unsaturation in the main chain, as opposed to in the side chain only, tends to be susceptible to damage (loss of physical properties) from ozone exposure. Ozone reacts with the site of unsaturation to cause chain scission, where the polymer chain is severed. The general class of elastomers with unsaturation in the main chain is represented by the so-called diene rubbers. A diene rubber has unsaturation in the main chain by virtue of polymerizing an olefin with a diene, such as butadiene or isoprene. Natural rubber is such a diene rubber. Many synthetic rubbers are made from dienes, in order to mimic the chemical structure of natural rubber.

EPDM is an elastomer made by copolymerizing ethylene and propylene in the presence of a third monomer that is a diene. The nature of the diene molecule used in the EPDM elastomer is such that unsaturation is found in the polymer only in the side chains and not in the main chain. As a result, EPDM is an elastomer that is inherently resistant to ozone attack. The side chain unsaturation is, however, susceptible to cure by reacting with sulfur-based curing agents. Methods of making ozone-resistant polymer blends involve thorough mixing and co-curing of an EPDM-type elastomer that is combined in minor amounts with a rubber curable diene rubber such as natural rubber.

Methods for Making Ozone-Resistant Polymer Blends

One design involves a three-pass mixing process conducted in an internal rubber mixer to blend EPDM and natural rubber polymers. A first pass involves blending EPDM with an accelerator and optionally other rubber formulation chemicals to make a pre-treated EPDM. A second pass involves blending the pre-treated EPDM of the first pass with a diene rubber such as natural rubber, along with optional rubber formulation chemicals that can be the same as or different from those provided in the first pass. In a third pass, the blend of pre-treated EPDM and diene rubber (from the second pass) is combined with a cure package containing elemental sulfur. The product of the three-pass process is a blend of uncured (but pre-treated) EPDM with uncured diene rubber.

More generally, in the first pass, an EPDM (preferably of relatively high molecular weight) is blended with rubber materials such as a suitable filler (carbon black, silica, etc.), oil, stearic acid, and rubber vulcanizing chemicals, but not including elemental sulfur. As noted above, the rubber vulcanizing chemicals include an accelerator and can include other components such as a sulfur donor. All the items in the first pass are initially blended together in a conventional manner. However, before discharging the mixture, an additional reactive mix procedure is carried out. During the reactive mix procedure, the mixture of EPDM and the accelerator is mixed for a suitable time to make the pre-treated EPDM polymer.

After the EPDM blend from the first pass has rested, a portion of the EPDM blend is combined with natural rubber or diene rubber and optional other materials such as filler, chemical additives, and stearic acid. The second pass mixing is also carried out in an internal mixer. The mix procedure in the second pass is carried out in conventional fashion.

In the third pass, the material from the second pass is allowed to rest and then processed again in an internal mixer. In the third pass, curative chemicals are added—but at a temperature lower than that at which curing via sulfur crosslinks would occur. The curative chemicals include elemental sulfur, an activator such as zinc oxide and preferably other components such as accelerators. The completed compound (i.e., the compound produced in the third pass) can be used in typical injection molding processes without modification to standard methods.

Reactive Mix

A feature of the first pass is the reactive mix procedure that is carried out after the components are blended. In the reactive mix procedure, the EPDM in the first pass is reacted with an accelerator. It is believed that reaction with the accelerator creates a pre-treated EPDM that has an increase of cure rate compared to untreated EPDM. As such, the pre-treated EPDM has cure kinetics more similar to that of the natural rubber or other diene rubber that is mixed with it in the second pass. It is believed that the increased cure rate of the EPDM in the blend leads to compatibility with the natural rubber or other diene rubber, since they have commonized cure kinetics. The compatibility during cure in turn is believed to lead to the effectiveness of the EPDM present in the blend at low levels to give ozone resistance to the mixture.

In one aspect, the accelerator used in the reactive mix is selected from polymers containing sulfur. In a preferred embodiment, the accelerator is selected from poly(alkyl phenol) disulfide polymers. Non-limiting examples include poly(t-butylphenol) disulfide and poly(t-amylphenol) disulfide. Suitable components are commercially available under the Vultac® tradename.

The accelerator is reacted with the EPDM polymer in the first pass to give a pre-treated EPDM. It is thought that covalent incorporation of components of the accelerator into the EPDM make an intermediate that has an improved cure rate compared to untreated EPDM. As such, the duration of the reactive mix has an effect on the suitability of pre-treated EPDM for use in the blend. Empirically, it has been found suitable to react the accelerator with the EPDM in the first pass for a time greater than one minute and less than five minutes, given that the temperature of reaction is a minimum of 330° F. (or 165° C.). In various embodiments, suitable incorporation of the accelerator into the pre-treated EPDM is achieved when the reactive mix is carried out for at least three minutes at these temperatures. Thus, the reactive mix is carried out at a temperature higher than the rest of the first pass and acts to create a reaction between the EPDM and the vulcanizing chemicals (i.e., the accelerator) so that it will cure at a similar rate to the natural rubber or diene rubber present in the composition after the second pass.

Alternative Four-Pass Design Mixture

The basic procedure of the three-pass mix provides preferred properties. A suitable four-pass mix procedure is also possible. All mixing is conducted in the standard internal mixer. In a first pass, the reactive mix of the EPDM blend is prepared as described above. In a second pass, a standard masterbatch mix is made of natural rubber, filler, and chemical additives. In a third pass, the rested EPDM from the first pass and the natural rubber from the second pass are cross-blended together. Finally, in a fourth pass, the EPDM/rubber blend from the third pass is combined with activator and curative chemicals. Essentially, the four-pass design breaks the second pass into two separate mixes.

Formulation Details

Details of the rubber components added in the various passes of the reactive mix and other procedures is given in the working examples that follow. The object of the three-pass procedure or the alternative four-pass procedure including the reactive mix is to prepare—in the presence of a curative system—a blend of uncured polymers that can be molded and cured into rubber components having suitable elastomeric properties including resistance to ozone attack. Since the product of the method is a fully formulated curable rubber, it follows that in the first, second, and third passes, all of the rubber components of the formula need to be added. Advantageously, the first and second passes can be run at elevated temperature if needed to facilitate the homogeneity of blending of the EPDM, natural rubber (or other synthetic diene rubber), and other chemical components.

In addition to the information in the working examples, the following comments are offered. As for the EPDM polymer, it is preferred to use a relatively high molecular weight grade. A suitable component is Keltan® 9650Q, supplied by Arlanxeo Performance Elastomers. If other grades are used, it is preferred to choose solid grades—not liquid. Another suitable grade is Keltan 3960Q. For cost reasons, it is desirable to keep the level of EPDM as low as possible while still achieving suitable ozone resistance. In general, it is desirable to incorporate at least about 5% or at least about 10% of EPDM in the blend. For cost reasons, it is desirable to keep the EPDM level to less than 50%, less than 35%, or about 25% or less of the EPDM based on the total polymer content. In the working examples, compositions having about 25% EPDM and 75% natural rubber give acceptable ozone resistance. To achieve this level of ozone resistance, reactive mix is carried out in the first pass for about 3 minutes. Increasing the EPDM in the blend increase the ozone resistance, but at the trade-off of increased cost.

Suitable grades of accelerator to pre-treat the EPDM include Vultac® 7, which is also known as Vultac® TB7. Vultac® TB7 is a grade of poly-t-butylphenol disulfide produced by Arkema.

Sulfur donors can also be utilized in the first mix pass. An example used herein is Rhenogran CLD-80. It has the chemical structure of caprolactam disulfide. Zinc oxide is standard for rubber formulations to activate the curing process and is added in the third pass at low temperatures to avoid premature cure of the blend.

Along with the zinc oxide, other cure system chemicals include stearic acid, which assists in activating the curing process by interacting with the zinc oxide; and other accelerators, not used in the reactive mix. These accelerators are added with the elemental sulfur in the final mix pass. Vulkacit NZ/EGC is a tradename for N-tert-butyl-2-benzothiazyl sulfonamide, commonly known as TBBS. Other suitable accelerators can be used to speed up the cure process of the rubber products. Non-limiting examples are chosen from the class of sulfonamides, amines, guanidines, xanthates, dithiocarbamates, thiazoles, thioureas, thiurams, disulfides, or other sulfur donors. Finally, elemental sulfur is added in the final mix pass. Elemental sulfur creates cross-links between polymer chains and is the main curing agent.

Carbon black is a common filler used in the rubber formulations. Suitable grades include, without limitation, N-339, N-550, N-683, and N-762. Carbon black is available from numerous suppliers.

Standard naphthenic oils can be used to improve the processability of the rubber compound. A non-limiting example is Calsol® 8240.

Several grades of natural rubber are available and, in addition, any diene polymer can be utilized. SIR-20 used in the examples is a technical standard rubber from Indonesia ('SIR' standing for Standard Indonesia Rubber). In general, any grade of technical standard natural rubber from a number of sources or suppliers can be used. Other grades of natural rubber include Ribbed Smoke Sheet #1 or #3 (abbreviated RSS). Higher purity grades include 'L' grades of natural rubber.

The compositions can also include process aides such as, without limitation, Struktol A50, which is a zinc salt of unsaturated fatty acids.

Conventional antioxidants can also be used in the compositions to increase the ozone resistance of the blends. A representative compound used in the examples is Vulkanox 4020/LG, commonly known as 6PPD.

Many other chemicals can optionally be used in the rubber formulations. These include other grades of fillers or chemical modifiers. Further examples include retarders and other cure chemicals such as Vulcuren to create a heat resistant natural rubber compound.

Diene Polymers and Other Diene Polymers as the Primary Polymer

Instead of the grade of natural rubber, any rubber polymer having unsaturation, defined as a double bond in the main polymer chain, is useable in the blends. Using this method, EPDM blends will provide ozone resistance to these other types of polymers. Such polymers include those based on isoprene or butadiene. Non-limiting examples include polyisoprene, which is a synthetic chemical equivalent of natural rubber. Others include, without limitation, polybutadiene, acrylonitrile butadiene, styrene butadiene, and polychloroprene. Other additive polymers can be added into the mix with the natural rubber (or diene rubber) and EPDM.

EXAMPLES

A general three step process according to Example 1 was used to formulate vulcanizable rubber compositions containing EPDM rubber. The compositions were then cured (vulcanized) to give cured EPDM/rubber blends with physical properties in Example 8.

Example 1: A Step-by-Step Representative Mix Procedure for Lab Scale Internal Mixer

| 1$^{st}$ Pass - react EPDM with accelerators | |
|---|---|
| Turn off cooling water, Heat mixer to 80° C. | |
| Need to build heat for reaction to occur | |
| Initial set at 100 rpm | |
| Add polymer (EPDM) and half of black | 30 sec |
| Add remainder of black, oil and chemicals | 85 sec |
| Increase speed if needed up to 115 rpm | until temp is 160-175° C |
| Keep ram down (reactive mix step) | 180 sec |
| Approximately every minute may need to reduce speed by 10-15 rpm to keep temperature within desired range. | |
| Target of 165° C. | |
| Sweep, depending on amount on ram | 15-30 sec |
| Discharge | |

| 2$^{nd}$ Pass - treat as typical 2 polymer mix | |
|---|---|
| 100 rpm, cooling water on | |
| Add natural rubber or diene rubber and pre-treated EPDM to break down (30 sec) | |
| Add half the carbon black | 85 sec |
| Add remainder of black and all chemicals | 45 sec |
| Sweep | 20 sec |
| Discharge | |

| 3$^{rd}$ Pass - treat as normal finish pass sandwich mix |
|---|
| 100 rpm, cooling water on |
| Add half of pass 2 masterbatch, all chemicals, remainder of masterbatch |
| Discharge |

Example 2: 140A

| 1$^{st}$ Pass | 2$^{nd}$ Pass | 3$^{rd}$ Pass |
|---|---|---|
| 40.00 phr - Keltan 9650Q | 77.00 phr - Intermediate From 1$^{st}$ Pass | 168.75 phr - Intermediate From 2$^{nd}$ Pass |
| 20.00 phr - N-339 | 58.50 phr - SIR-20 | 0.50 phr - TBBS accelerator |
| 1.00 phr - Vultac TB7 | 28.00 phr - Cabot N-339 | 1.00 phr Rubbermakers Sulfur |
| 13.00 phr - Naphthenic Oil | 0.75 phr - Stearic Acid | 6.50 phr - Zinc Oxide Masterbatch |
| 0.50 phr - Stearic Acid | 1.50 phr - 6PPD | |
| 0.50 phr - Rhenogran CLD-80 | 3.00 phr - Struktol A 50 | |
| 2.00 phr - Struktol A 50 | | |

Example 3: 105B

| 1$^{st}$ Pass | 2$^{nd}$ Pass | 3$^{rd}$ Pass |
|---|---|---|
| 35.00 phr - Keltan 9650Q | 76.50 phr - Intermediate From 1$^{st}$ Pass | 155.00 phr - Intermediate From 2$^{nd}$ Pass |
| 30.00 phr - N-339 | 63.50 phr - SIR-20 | 0.50 phr - TBBS accelerator |
| 1.00 phr - Vultac TB7 | 15.00 phr - N-339 | 1.00 phr - Rubbermakers Sulfur |
| 8.00 phr - Naphthenic Oil | | 6.50 phr - Zinc Oxide Masterbatch |
| 2.00 phr - Stearic Acid | | |
| 0.50 phr - Rhenogran CLD-80 | | |

Example 4: 105C

| 1$^{st}$ Pass | 2$^{nd}$ Pass | 3$^{rd}$ Pass |
|---|---|---|
| 35.00 phr -Keltan 9650Q | 63.00 phr - Intermediate From 1$^{st}$ Pass | 159.25 phr - Intermediate From 2$^{nd}$ Pass |
| 17.50 phr - N-339 | 63.50 phr - SIR-20 | 0.50 phr - TBBS accelerator |
| 1.00 phr - Vultac TB7 | 31.75 phr - N-339 | 1.00 phr - Rubbermakers Sulfur |
| 8.00 phr - Naphthenic Oil | 1.00 phr - Stearic Acid | 6.50 phr - Zinc Oxide Masterbatch |
| 1.00 phr - Stearic Acid | | |
| 0.50 phr - Rhenogran CLD-80 | | |

Example 5: 105D-1

| 1st Pass | 2nd Pass | 3rd Pass |
|---|---|---|
| 25.00 phr - Keltan 9650Q | 48.00 phr - Intermediate From 1st Pass | 154.25 phr - Intermediate From 2nd Pass |
| 12.50 phr - N-339 | 73.50 phr - SIR-20 | 0.50 phr - TBBS accelerator |
| 1.00 phr - Vultac TB7 | 31.75 phr - N-339 | 1.00 phr - Rubbermakers Sulfur |
| 8.00 phr - Naphthenic Oil | 1.00 phr - Stearic Acid | 6.50 phr - Zinc Oxide Masterbatch |
| 1.00 phr - Stearic Acid | | |
| 0.50 phr - Rhenogran CLD-80 | | |

Example 6: 110D

| 1st Pass | 2nd Pass | 3rd Pass |
|---|---|---|
| 100.00 phr - Keltan 9650Q | 26.96 phr - Intermediate From 1st Pass | 158.96 phr - Intermediate From 2nd Pass |
| 50.00 phr - N-339 | 85.00 phr - SIR-20 | 0.50 phr - TBBS accelerator |
| 2.50 phr - Vultac TB7 | 42.50 phr - N-339 | 1.00 phr - Rubbermakers Sulfur |
| 25.00 phr - Naphthenic Oil | 1.00 phr - Stearic Acid | 6.50 phr - Zinc Oxide Masterbatch |
| 1.00 phr - Stearic Acid | 1.50 phr - 6PPD | |
| 1.20 phr - Rhenogran CLD-80 | 2.00 phr - Durazone 37 | |

Example 7: 110E

| 1st Pass | 2nd Pass | 3rd Pass |
|---|---|---|
| 100.00 phr - Keltan 9650Q | 26.96 phr - Intermediate From 1st Pass of 04JP110A | 156.96 phr - Intermediate From 2nd Pass |
| 50.00 phr - N-339 | 85.00 phr - SIR-20 | 0.50 phr - TBBS accelerator |
| 2.50 phr - Vultac TB7 | 42.50 phr - N-339 | 1.00 phr - Rubbermakers Sulfur |
| 25.00 phr - Naphthenic Oil | 1.00 phr - Stearic Acid | 6.50 phr - Zinc Oxide Masterbatch |
| 1.00 phr - Stearic Acid | 1.50 phr - 6PPD | |
| 1.20 phr - Rhenogran CLD-80 | | |

Physical properties of the compositions made in Examples 2-7 after curing are given in the following table.

| Formulation ID | 105B | 105C | 105D-1 | 110D | 110E |
|---|---|---|---|---|---|
| phr EPDM | 35 | 35 | 25 | 15 | 15 |
| Black Content | 45 phr | 49.25 phr | 44.25 phr | 50 phr | 50 phr |
| Mixing Passes | 3 | 3 | 3 | 3 | 3 |
| Tensile, MPa | 18.287 | 16.270 | 17.260 | 21.568 | 19.838 |
| Elongation, % | 553 | 481 | 490 | 584 | 507 |
| Stress @ 100%, MPa | 1.75 | 2.20 | 1.88 | 1.67 | 1.82 |
| Stress @ 300%, MPa | 7.78 | 9.28 | 8.81 | 8.18 | 9.59 |
| Durometer, A | 60.4 | 65.4 | 58.8 | 54.3 | 54.0 |
| Tear (C), N/mm | 62.7332 | 56.9184 | 53.66 | 72.71 | 73.96 |
| Ozone - Conc. | 200 pphm | 200 pphm | 200 pphm | 200 pphm | 200 pphm |
| Ozone - Time | Pass 144 h | Pass 456 h | Pass 144 h | Pass 144 h | Pass 144 h |
| Ozone - Type | Static. | Static | Static | Static | Static |

What is claimed is:

1. A shaped article formed from a cured rubber composition comprising:
    ethylene propylene diene monomer (EPDM) having an organic polymer comprising sulfur covalently incorporated therein;
    a diene rubber; and
    a curing agent that cures the EPDM having the organic polymer comprising sulfur covalently incorporated therein to the diene rubber,
    wherein the article has a coefficient of friction greater than 0.1, and
    wherein the EPDM having the organic polymer comprising sulfur covalently incorporated therein is present in the cured rubber composition at a concentration of greater than about 5 wt. % and less than about 25 wt. % based on the total weight of the EPDM and the diene rubber.

2. The shaped article according to claim 1, wherein the article has a coefficient of friction greater than 0.2.

3. The shaped article according to claim 1, wherein the article has a coefficient of friction greater than 0.5.

4. The shaped article according to claim 1, wherein the article has a coefficient of friction from 0.5 to 0.8.

5. The shaped article according to claim 4, giving a pass on an ozone resistance test according to ASTM D-1149 when subjected to 50 pphm ozone for 72 hours at 40° C.

6. The shaped article according to claim 1, wherein the article has a coefficient of friction from 0.6 to 0.7.

7. The shaped article according to claim 1, giving a pass on an ozone resistance test according to ASTM D-1149 when subjected to 200 pphm ozone for 24 hours at 40° C.

8. The shaped article according to claim 1, wherein the article comprises 25 wt. % EPDM and 75 wt. % diene rubber based on the total weight on the EPDM having the organic polymer comprising sulfur covalently incorporated therein and the diene rubber.

9. The shaped article according to claim 1, wherein the organic polymer comprising sulfur includes a poly(alkyl phenol) disulfide polymer.

10. The shaped article according to claim 1, wherein the cured rubber composition does not include a wax.

11. A shaped article formed from a cured rubber composition comprising:
   a diene; and
   an ethylene propylene diene monomer (EPDM) having an organic polymer comprising sulfur covalently incorporated therein,
   wherein the diene is cross-linked to the EPDM having the organic polymer comprising sulfur with elemental sulfur.

12. The shaped article according to claim 11, wherein the EPDM having the organic polymer comprising sulfur covalently incorporated therein is present in the cured rubber composition at a concentration of greater than about 5 wt. % and less than about 25 wt. %.

13. The shaped article according to claim 11, wherein the organic polymer comprising sulfur includes a poly(alkyl phenol) disulfide polymer.

14. The shaped article according to claim 13, wherein the shaped article has a coefficient of friction greater than 0.2 and passes an ozone resistance test according to ASTM D-1149 when subjected to 200 pphm ozone for 24 hours at 40° C.

* * * * *